Feb. 25, 1958  T. E. DE ROSA  2,824,479
MUSIC CHORD INDICATOR
Filed July 26, 1954  2 Sheets-Sheet 1
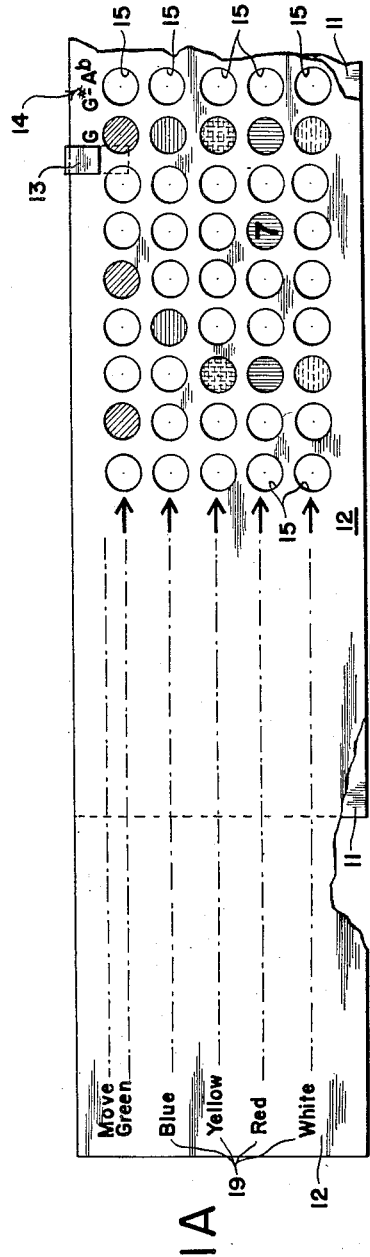
FIG. IA
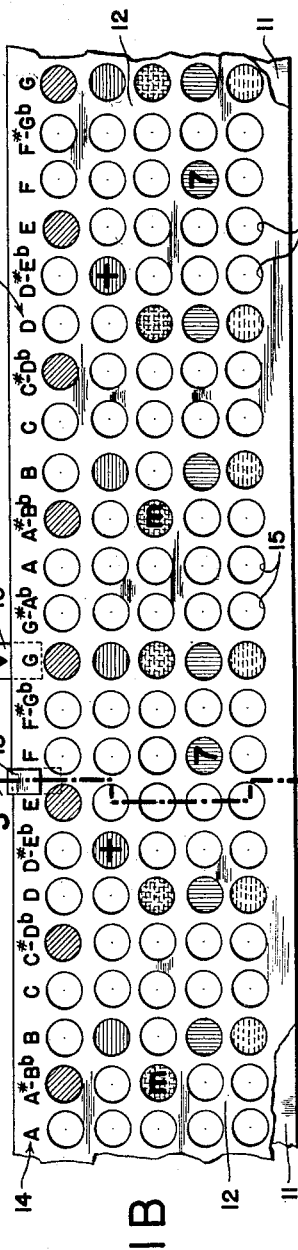
FIG. IB
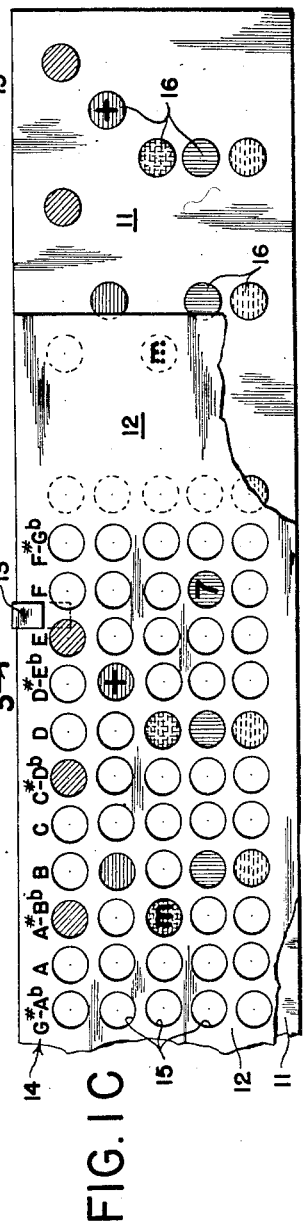
FIG. IC
INVENTOR
Thomas E. De Rosa
BY
ATTORNEYS

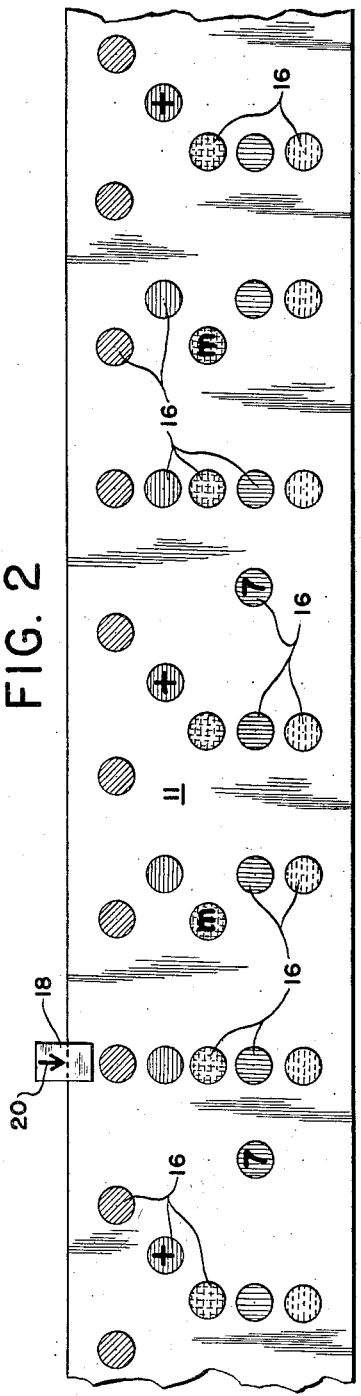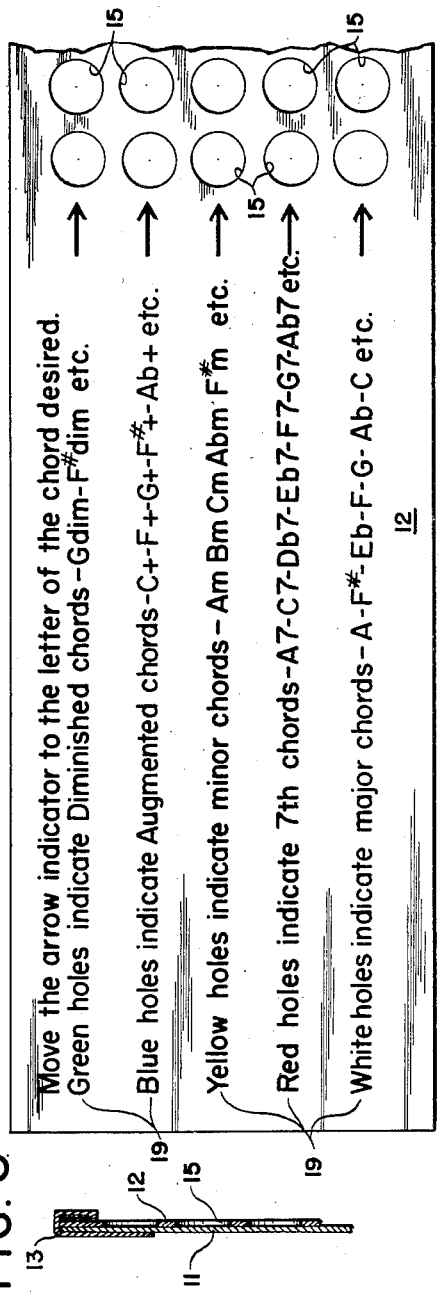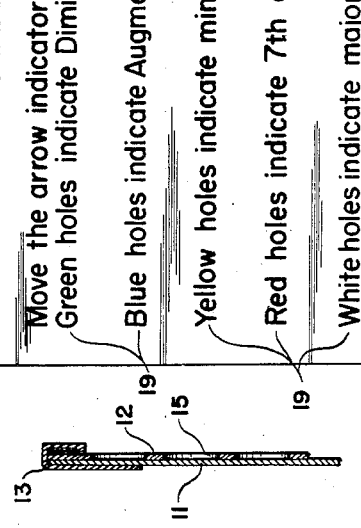

United States Patent Office 2,824,479
Patented Feb. 25, 1958

2,824,479

MUSIC CHORD INDICATOR

Thomas E. DeRosa, Mamaroneck, N. Y.

Application July 26, 1954, Serial No. 445,531

4 Claims. (Cl. 84—482)

This invention relates to music chord indicators and, more particularly, to an indicator which is adapted to be placed behind a piano keyboard so as to indicate directly the piano keys which constitute any desired chord on any key base.

Music chord indicators have been devised heretofore for the purpose of teaching a novice the piano notes which constitute a variety of chords for each and every key base. It has been characteristic of such indicators heretofore that they have been complicated to use and that they have been a distraction rather than an aid in playing the chords.

I have now devised a music chord indicator which is the epitome of simplicity to use and a direct aid in the playing of all chords on a piano keyboard. The chord indicator of my invention is adapted to being set in a vertical plane at the rear of the piano keyboard immediately in front of the piano face board. The chord indicator comprises a flat backing element of sufficient length to span at least several octaves of piano keys and a flat frontispiece slidably engaging the backing element for movement longitudinally of the backing element. The frontispiece is provided with at least one octave of chromatic indicia which are adapted to be physically aligned with the keys of at least one chromatic octave of the piano and is further provided with a plurality of longitudinal rows of substantially equally spaced openings with the openings in each row adapted to be serially aligned with the keys of at least one octave of the piano. The backing element is provided with a fixed index adapted to be placed in registry with any one of the keys of the chromatic octave indicia on the frontispiece. The portion of the backing element position in back of the frontispiece is provided with a plurality of longitudinal rows of indicator patterns aligned with the rows of openings in the frontispiece. The pattern of each row is such as to present through the openings in the frontispiece an indication for each of the keys of the piano aligned therewith which constitute a musical chord based on the key of the frontispiece chromatic indicia with which the index of the backing element is in registry. The patterns of the indicators of each of the rows thereof correspond to different chords for each such base key.

These and other novel features of the music chord indicator of my invention will be more fully understood by reference to the accompanying drawings in which—

Figs. 1A, 1B and 1C are consecutive portions of a plan view of my music chord indicator;

Fig. 2 is a plan view of a portion of the backing element component of the chord indicator;

Fig. 3 is a vertical cross-section of the indicator taken along line 3—3 of Fig. 1B; and Fig. 4 is a plan view of an end portion of the frontispiece component of my chord indicator.

The music chord indicator of my invention, as shown in Figs. 1A, 1B and 1C, comprises a flat backing element 11 of sufficient length to span at least several octaves of piano keys, preferably five or six octaves. In front of a major portion of the backing element 11 there is positioned a flat frontispiece 12. The frontispiece slidably engages the backing element for movement longitudinally thereof. For this purpose, either the upper or lower longitudinal edges, or both, are engaged by a plurality of U-shaped clips 13 (Fig. 3) permanently secured to either the frontispiece 12 or the backing element 11 and slidably engaging the distal surface of the other. It must be understood, however, that the details of the interconnection of the frontispiece with the backing element may be varied without departing from the spirit of the invention.

The frontispiece is provided with at least one octave of chromatic indicia 14 adapted to be physically aligned with the keys of at least one chromatic octave of the piano. The frontispiece is also provided with a plurality of longitudinal rows of openings 15 in each of which rows the openings are advantageously substantially equally spaced. That is, the openings in each row are so spaced with respect to one another as to be adapted to be serially aligned with the chromatic sequence of keys of at least one octave of the piano, and advantageously for two to four octaves of the piano. The several rows of openings are preferably of identical spacing and thus present vertically aligned rows of openings, each of these vertical rows corresponding to a separate key on the piano.

As shown in Fig. 2, the backing element 11 is provided with a plurality of longitudinal rows of indicator patterns 16 aligned with the rows of openings in the frontispiece. These indicator patterns are different for each longitudinal row thereof so that each row represents the appropriate pattern for indicating through the openings in that row on the frontispiece, the keys of the piano which constitute different musical chords based on any key. Thus, the patterns have one common vertical row of indicators for each octave of keys, and one of these rows is further supplemented by a projecting index tab 18 secured to the body of the backing element 11 in vertical alignment with this row. One end of the frontispiece is also advantageously provided with a notation 19 of the form of the chord to which each row of indicator patterns corresponds, these notations being illustrated in the drawings by the major chord, the dominant seventh chord, the minor chord, the augmented fifth chord and the diminished seventh chord. These chords may also be noted by a mark on the characteristic note of each chord, such as a "7" for the dominant seventh, and "M" for the minor, and a "+" mark for the augmented fifth.

In order to use the music chord indicator of my invention, it is simply set up at the back of the piano keyboard against the face board of the piano. The entire indicator assembly is positioned lengthwise of the piano keyboard in such manner that the chromatic indicia on the frontispiece are aligned with the corresponding keys in a middle register of the piano keyboard. The vertical rows of openings in the frontispiece will then be aligned with the chromatic sequence of keys throughout one or more octaves of the keyboard. When the player has ascertained from the music the key base about which he wishes to build a chord, he then grasps the projecting index tab 18 and moves it (and therefore the backing element) to the right or to the left until the index arrow 20 on the index tab is placed in registry with the key of the chromatic indicia on the frontispiece which corresponds to the base of the chord which he wishes to form. In Fig. 1, it is assumed that the key base is G and therefore the index arrow 20 of the tab 18 is placed in registry with G in the chromatic indicia 14 on the frontispiece. The longitudinal rows of indicator patterns on the backing element will thus be so aligned with the vertical rows of openings in the frontispiece as to indicate through appropriate openings those notes corresponding to each such vertical row which should be played in order to make up the desired chord. For example, the indicators appearing in the lowermost longitudinal row of openings corresponding to the major chord on G indicates that, from left to right on this row, the G major chord is made up of DGBD, etc. The second longitudinal row indicates, by similar indicators appearing in the frontispiece openings of this row, that the dominant seventh chord on G is made up of the keys DFGBD, etc. The next higher longitudinal row of openings shows that the G minor chord is made up of DGBA#D, etc. The next higher row of openings indicates that the G augmented fifth chord is made up of D#GBD#G, etc. The top row of longitudinal openings shows that the diminished chord on G is made up of GA#C#EG, etc.

The indicator patterns 16 may be of any design or type which will provide a contrast to the surface of the frontispiece. I have found it particularly advantageous to provide this contrast by forming each horizontal row of indicators by dots of the same color, a different color being used for each row.

By using sheet material of suitable stiffness for the backing element and frontispiece, it will be understood that these two parts can be quickly and readily moved to the left or right with respect to one another so as to promptly indicate the various chords for each key of the piano. The rigidity of the backing element and of the frontispiece should also be such as to permit the chord indicator to stand upright in back of the piano keys, and if desired, an additional supporting stand or other anchoring device may be provided in order to assure the upright position of the chord indicator while in use.

As stated, black and white may be used as the contrasting colors. In such an arrangement for example, the backing element 11 and the frontispiece 12 may be black and the indicator patterns are white. When the sliding member is set to indicate notes in a given key, the openings 15 through which the white color shows are the keys which make up the chord. The openings 15 have been shown as circles in the drawings, but they may be of any other desired shape. Also the openings of different rows may be of different shapes to enable the user to more readily spot the notes of the chord in which he is interested. Thus, with the openings in the lower row which indicate the major chord in the form of circles, the other rows of openings may be square, triangular, diamond-shaped, hexagonal or octagonal.

I claim:

1. A music chord indicator adapted to being set in a vertical plane at the rear of a piano keyboard immediately in front of the piano face board and comprising a flat backing element of sufficient length to span at least several octaves of piano keys, and a flat frontispiece slidably engaging the backing element for movement longitudinally of the backing element, said frontispiece being provided with at least one octave of chromatic indicia adapted to be physically aligned with the keys of at least one chromatic octave of the piano and being further provided with a plurality of longitudinal rows of substantially equally spaced openings with the openings in each row adapted to be serially aligned with the keys of at least one octave of the piano, the backing element being provided with a fixed index adapted to be placed in registry with any one of the keys of the chromatic octave indicia on the frontispiece, the portion of the backing element positioned in back of the frontispiece being provided with a plurality of longitudinal rows of indicator patterns aligned with the rows of openings in the frontispiece, the pattern of each row being such as to present through the openings in the frontispiece an indication for each of the keys of the piano aligned therewith which constitute a musical chord based on the key of the frontispiece chromatic indicia with which the index of the backing element is in registry, the patterns of the indicators of each of the rows thereof corresponding to different chords for each such base key.

2. A music chord indicator adapted to be set in a vertical plane at the rear of a piano keyboard and comprising a flat backing element of sufficient length to span at least several octaves of piano keys, a flat frontispiece movably connected to the backing element for movement longitudinally thereof, the frontispiece being provided with a plurality of longitudinal rows of substantially equally spaced openings, the openings in each of said rows being adapted to be serially aligned with the keys of at least one octave of the piano, the backing element being provided with longitudinal rows of indicator patterns aligned with the rows of openings in the frontispiece, and tab means for relatively positioning the backing element and the frontispiece so as to indicate through said openings in the frontispiece the keys of the piano which constitute a musical chord in the key for which the backing element and frontispiece are positioned relative to one another.

3. A device in accordance with claim 2 in which the frontispiece is provided with chromatic indicia adjacent its upper longitudinal edge adapted to be aligned with the keys of at least one chromatic octave of the piano and to cooperate with the backing element in setting their relative position to indicate the keys of the chords in a selected base key.

4. A device in accordance with claim 2 in which the indicator patterns of each row thereof on the backing element are of contrasting colors.

References Cited in the file of this patent

UNITED STATES PATENTS

| | | |
|---|---|---|
| 363,392 | Huard | May 24, 1887 |
| 605,157 | Wickersam | June 7, 1898 |
| 658,902 | Turner | Oct. 2, 1900 |
| 766,215 | Branson | Aug. 2, 1904 |
| 877,339 | Hobart | Jan. 21, 1908 |
| 1,017,045 | French et al. | Feb. 13, 1912 |
| 1,594,977 | Payne | Aug. 3, 1926 |
| 2,280,593 | Maffei | Apr. 21, 1942 |
| 2,332,842 | Champion | Oct. 26, 1943 |
| 2,497,364 | Mayberry | Feb. 14, 1950 |